2,719,183

ISOMERIZATION OF XYLENES

Edward R. Boedeker and William E. Erner, Wilmington, Del., assignors to Houdry Process Corporation, Wilmington, Del., a corporation of Delaware No Drawing. Application July 2, 1952,
Serial No. 296,950

10 Claims. (Cl. 260—668)

This invention relates to the catalytic isomerization of alkyl benzenes of higher carbon content than toluene, and particularly to such isomerization of dialkyl benzenes such as xylene and is especially concerned with reactions in which cracking and disproportionation of the alkyl benzene are subordinate to the isomerization.

The isomerization of various xylenes, for instance, to other isomeric forms is a reaction well-known in the art. The various isomeric forms of xylene, either ortho-xylene, meta-xylene, para-xylene or ethylbenzene can be converted into the other isomeric forms by catalytic and noncatalytic reactions such as those described in an article by R. C. Hansford, C. G. Myers and A. N. Sachanen entitled, "Conversion of Aromatics" and appearing in Industrial and Engineering Chemistry, volume 37 (1945), at page 671 et seq., or in various patents, typical of which are U. S. 2,403,757 to Reeves or U. S. 2,564,388 to Bennett et al. It has likewise been shown that the reactions resulting in the isomerization of such xylenes are effected at such conditions that frequently excessive and objectionable amounts of cracking and/or disproportionation likewise result.

It has now been found that under selected conditions hereinafter appearing improved isomerization of xylenes, particularly meta-xylene to more valuable para-xylene can be accomplished with substantially no concomitant cracking and/or disproportionation of the charge stock. The isomerized product is obtained as an equilibrium mixture containing in addition to the desired para-xylene also ortho-xylene and non-isomerized meta-xylene as well as some ethylbenzene, and relatively free of other side-reaction products.

In accordance with this invention isomerization of xylenes, particularly meta-xylene, to equilibrium mixtures of xylene isomers is obtained by reacting a suitable charge stock comprising $C_2$-benzene at subatmospheric pressure in the presence of a suitable catalyst and at isomerizing conditions of temperature and space rate.

Surprisingly, it has been found that isomerization is the predominant reaction when the operating pressures are of the order of half an atmosphere and less, such as down to approximately one-tenth of an atmosphere. While lower pressures are quite practical as far as use in a reaction of predominantly isomerizing nature, little benefit accrues from operations at pressures much lower than one-tenth of an atmosphere in that the space rate or charge throughput becomes impractically low; however, for reasons other than volumetric throughput such low pressures as down to several millimeters Hg are effective. At pressures above half an atmosphere or thereabouts, the conversion resulting from disproportionation becomes rapidly greater and at pressures at atmospheric and above become even more severe and cracking likewise becomes a relatively large feature to be considered.

The other conditions of the isomerization reaction include temperatures in the range of 850 to about 1200° F. with preferred temperatures in the range of 950–1050° F. Space rates are generally within the range of one-tenth to about three liquid volumes of charge per volume of catalyst per hour; however, space rates lying outside this general range may be employed with resultant sacrifices in isomerization conversion or charge throughput.

Catalysts for use in this system include typical cracking catalysts of the silica-alumina type, silica-zirconia, silica-magnesia and other catalytic materials such as those described in the Reeves patent above referred to. Other solid isomerization catalysts are suitable, particularly those which have a relatively mild acidic nature and which at the conditions of reaction give substantially only isomerization and little if any bimolecular disproportionation or cracking.

Example I

A charge stock having the composition of 84% meta-xylene, 9% para-xylene and 5% ortho-xylene was passed over a typical silica-alumina cracking catalyst at 950° F. at a space rate of .3 volume of oil per volume of catalyst per hour and at a pressure of 90 mm. Hg. An analysis of the product showed 18.4% para-xylene, 9.2% ortho-xylene, 60% meta-xylene, 11.5% ethylbenzene and 1% toluene. At atmospheric pressure under the same conditions 30% disproportionation was obtained.

Example II

In a run with the same charge stock and the same catalyst and at approximately the same pressure the temperature conditions were approximately 1000° F. and the space rate about 0.35 volume of oil per volume of catalyst per hour. There was obtained a product having approximately 95% equilibrium distribution of dialkyl benzenes, i. e., 45% meta-xylene, 21% ortho-xylene, 18.5% para-xylene, 12.8% ethylbenzene, 2.7% other products measured as toluene.

In isomerization reactions such as those described above, there is little if any formation of coke on the catalyst; however, if conditions are such that appreciable amounts of coke do form on the catalyst with resultant diminution of isomerization activity, the catalyst may be regenerated by any suitable regeneration method such as that employed in regeneration of cracking catalyst wherein free oxygen-containing gas is contacted with the coked catalyst at combustion conditions for a time sufficiently long to effect removal of substantially all of the coke deposit.

While the invention has been described with particular reference to the isomerization of xylenes, especially meta-xylene, it will be understood that the principles thereof also are applicable not only to similar conversion of the other isomeric forms of xylenes, including in the term ethylbenzene as well as para-xylene and ortho-xylene, but also in connection with higher homologues of these, embracing those of higher and/or a larger number of alkyl side chains, as well as those having non-similar alkyl substituents of one, two and three carbon atoms.

Obviously many modifications and variations of this invention as hereinbefore set forth may be made without departing from the spirit and scope thereof. Therefore only such limitations should be imposed as are indicated in the appended claims.

We claim:

1. The process for the isomerization of alkyl aromatic hydrocarbons of the benzene series above toluene, comprising passing the charge stock comprising such hydrocarbons over an isomerization catalyst under operating conditions including elevated temperature and pressure no higher than 0.5 atmosphere.

2. The process of claim 1 wherein said alkyl aromatic hydrocarbon stock comprises at least one dialkyl aromatic hydrocarbon.

3. The process of claim 1 wherein said charge comprises meta-xylene.

4. The process of claim 3 wherein said conditions include a temperature in the order of 850°–1250° F., a space rate in the order of 0.1 to 3, and a total pressure in the range of 0.1 to 0.5 atmosphere.

5. The process of claim 1 wherein said conditions include a temperature in the order of 850°–1250° F., a space rate in the order of 0.1 to 3, and a total pressure in the range of 0.1 to 0.5 atmosphere.

6. The process of claim 5 wherein said catalyst is a siliceous cracking catalyst.

7. The process of claim 3 wherein said catalyst comprises silica-alumina.

8. The process of claim 1 wherein said catalyst is a siliceous cracking catalyst.

9. The process of converting meta-xylene to a product comprising a substantially equilibrium mixture of xylenes and ethylbenzene which comprises contacting a meta-xylene rich hydrocarbon charge in a reaction zone with a siliceous isomerization catalyst at a temperature of 900–1050° F. under pressure of 0.1 atmosphere, and at a space rate in the range of 0.1 to 0.5.

10. In a process of catalytically isomerizing a dialkyl benzene to a product containing substantially equilibrium amounts of dialkyl benzene isomers under isomerization reaction conditions the improvement comprising effecting such reaction at subatmospheric pressure of no more than 0.5 atmosphere.

References Cited in the file of this patent

UNITED STATES PATENTS

| | | |
|---|---|---|
| 2,403,757 | Reeves | July 9, 1946 |
| 2,515,237 | Kutz | July 18, 1950 |